United States Patent [19]
Ohya

[11] Patent Number: 5,601,377
[45] Date of Patent: Feb. 11, 1997

[54] YOKE OF UNIVERSAL JOINT AND METHOD OF PRODUCING SAME

[75] Inventor: Masakiyo Ohya, Kosai City, Japan

[73] Assignee: Fuji Kiko Co., Ltd., Tokyo, Japan

[21] Appl. No.: 264,948

[22] Filed: Jun. 24, 1994

[30] Foreign Application Priority Data

Jul. 29, 1993 [JP] Japan .................. 5-187764

[51] Int. Cl.⁶ .................................... B21K 1/14
[52] U.S. Cl. ........................ 403/58; 403/88; 72/356; 72/377; 29/897.2; 29/417; 29/557; 29/DIG. 18
[58] Field of Search ................. 403/88, 57, 58; 29/897, 897.2, 419.1, 557, DIG. 18, DIG. 17, 412, 413, 417; 72/356, 377

[56] References Cited

U.S. PATENT DOCUMENTS

| | | | |
|---|---|---|---|
| 329,501 | 11/1885 | Strobel | 72/377 X |
| 691,565 | 1/1902 | Norton | 29/DIG. 17 X |
| 963,372 | 7/1910 | Johnson et al. | 72/377 |
| 1,407,709 | 2/1922 | Tibbals | 29/DIG. 17 X |
| 1,968,792 | 7/1934 | Yeomans | 72/356 X |
| 2,004,138 | 6/1935 | Story et al. | 29/DIG. 17 X |
| 2,047,368 | 7/1936 | Gerlach | 29/410 X |
| 2,127,618 | 8/1938 | Riemenschneider | 29/897.2 X |
| 2,364,628 | 12/1944 | Garlinghouse | 29/897 X |
| 2,697,953 | 12/1954 | Chapman | 72/356 |
| 2,748,464 | 6/1956 | Kaul | 29/DIG. 17 X |
| 3,514,989 | 6/1970 | Robinson | 72/377 |
| 3,808,390 | 4/1974 | Hammell et al. | 29/DIG. 18 X |
| 3,889,512 | 6/1975 | Delio | 72/377 |
| 3,974,677 | 8/1976 | Castellani et al. | 72/356 X |
| 4,233,833 | 11/1980 | Balinski | 72/377 X |
| 5,151,152 | 9/1992 | Kaeufe et al. | 29/557 X |

FOREIGN PATENT DOCUMENTS

| | | | |
|---|---|---|---|
| 39363 | 3/1979 | Japan | 29/897 |
| 58-93532 | 6/1983 | Japan . | |
| 60-118349 | 6/1985 | Japan . | |
| 62-20226 | 2/1987 | Japan . | |
| 3-140628 | 6/1991 | Japan . | |
| 69069 | 3/1993 | Japan | 29/897 |

*Primary Examiner*—Dave W. Arola
*Assistant Examiner*—Christopher J. Novosad
*Attorney, Agent, or Firm*—Foley & Lardner

[57] ABSTRACT

A yoke of a universal joint is substantially U-shaped and includes a base portion and first and second arm portions. A method of producing the yoke includes the sequential steps of: (a) shearing a metal plate which is rectangular in shape and has certain uniform width and thickness so as to form a blank which is rectangular in shape and consists of a middle portion and first and second end portions; (b) squeezing the middle portion of the blank by cold forging so that the middle portion is expanded to have first and second peripheral bulge portions which are opposed to each other and that the expanded middle portion becoming substantially oval in shape and thinner than the first and second end portions in thickness; and (c) pressing the blank with a press machine to produce the yoke so that the expanded middle portion and the first and second end portions of the blank are turned into the base portion and the first and second arm portions of the yoke, respectively. According to the method, the amount of waste steel is substantially reduced. The yoke is light in weight and improved in strength.

8 Claims, 7 Drawing Sheets

FIG.6 FIG.7
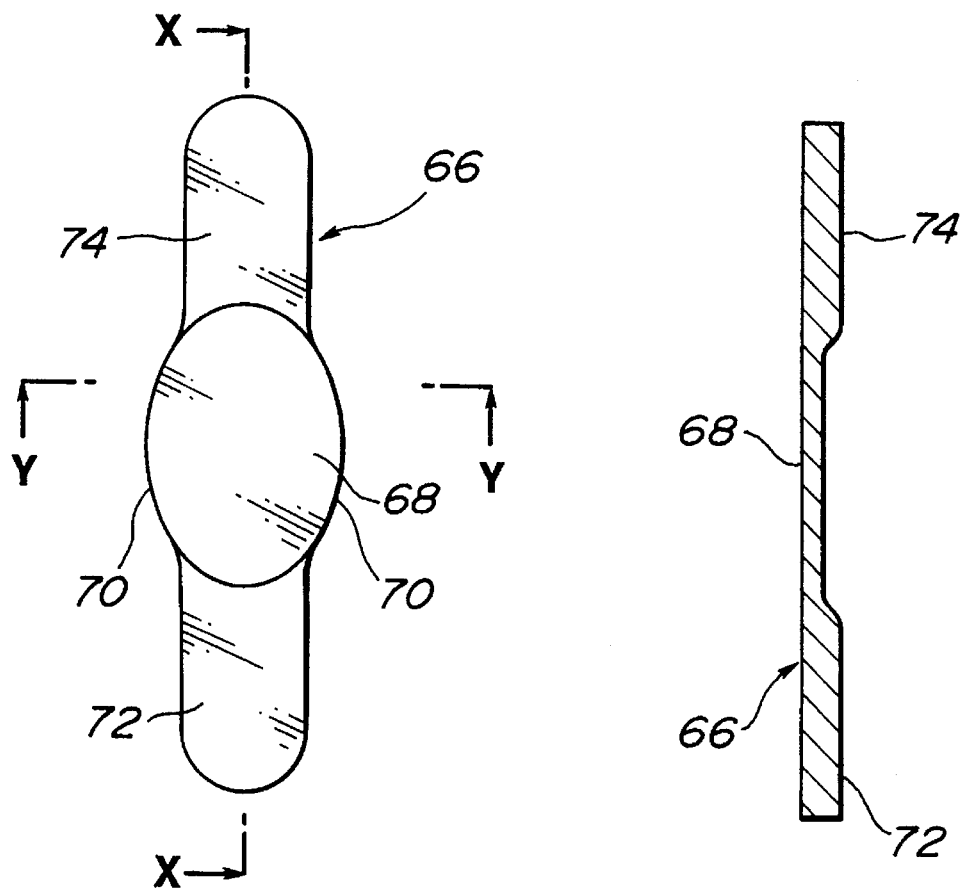
FIG.8
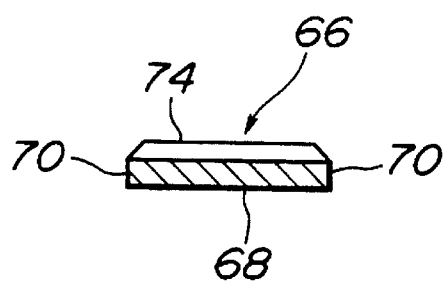

YOKE OF UNIVERSAL JOINT AND METHOD OF PRODUCING SAME

BACKGROUND OF THE INVENTION

1. Field of the Invention

The present invention relates to a yoke of a universal joint used in an automobile steering column and a method of producing the yoke.

2. Description of the Prior Art

An automobile steering column transmits the rotation of the steering wheel to the steering gearbox. For increasing the degree of freedom of geometric arrangement of the steering system, the steering column has a plurality of steering shafts which are connected with each other by universal joints. In general, the steering column is bent at each universal joint. With this, the steering wheel can be disposed at a desired position, and the steering column can be disposed in the engine room so as not to interfere with other parts disposed in the engine room.

In order to clarify the task of the present invention, a universal joint having a pair of conventional yokes and a cross will be outlined in the following with reference to FIGS. 13–17 of the accompanying drawings.

As is seen from FIG. 13, a universal joint 10 comprises a pair of yokes 12 and a cross 14. Each yoke 12 which is substantially U-shaped has a base portion 16 and a pair of arm portions 18. The base portion 16 is substantially parabolic in shape and has a circular opening 20 for connecting a steering shaft (not shown) with the yoke 12. The arm portions 18 are opposed to each other in a diametral direction of the yoke 12 and extend in an axial direction of the yoke 12. Each arm portion 18 has a circular opening 22 into which a bearing 24 is pressed. The cross 14 is rotatably held by the four bearings 24.

With reference to FIGS. 14–17, a conventional method of producing the yoke 12 will be described in the following.

At first, blanks 26 are formed by punching a long narrow rectangular steel plate 28 having a uniform thickness. Upon this, two punching manners are available with respect to the blank arrangement on the steel plate 28. One is that the blanks 26 are arranged in a manner to direct longitudinal axes of the blanks 26 in a direction which is perpendicular to a longitudinal axis of the steel plate 28 (see FIG. 14). The other is that the blanks 26 are arranged in a manner to direct longitudinal axes of the blanks 26 in a direction which is parallel to a longitudinal axis of the steel plate 28 (see FIG. 15). As is seen from FIG. 16, each blank 26 is elongate in shape and uniform in thickness and has first and second end portions 30, 32 and peripheral bulge portions 34 at its middle portion. After the blank formation, the blank 26 is pressed with a press machine so as to form the yoke 12 having the objective shape and a uniform thickness (see FIG. 17). With this pressing, in fact, the first and second end portions 30, 32 and the peripheral bulge portions 34 of the blank 26 are turned into the arm portions 18 and part of the base portion 16 of the yoke 12, respectively.

As is seen from FIG. 13, the universal joint 10 is produced by combining the yokes 12 with the cross 14 in a conventional manner. However, the thus produced conventional yoke has the following drawbacks.

The steel plate 28 can not efficiently be used by taking either of the above-mentioned two punching manners. In fact, oblique line portions shown in FIGS. 14 and 15 become waste due to the provision of the peripheral bulge portions 34 of the blank 26. This lowers the yield of the blank 26 and thus increases the production cost. As is seen from FIG. 16, fiber flows 36 (flows of metallographic structure) of the blank 26 are arranged in a longitudinal direction of the blank, and fiber flows 36 in the bulge portions 34 are sheared at their peripheral edges. Therefore, the blank 26 is lowered in strength. The arm portions 18 of the yoke 12 must have a certain thickness for holding the bearings 24 in the openings 22. Since the yoke 12 is uniform in thickness, the thickness of the base portion 16 becomes the same as that of the arm portions 18. Therefore, the yoke 12 becomes too heavy in weight.

SUMMARY OF THE INVENTION

It is therefore an object of the present invention to provide a yoke of an universal joint, which is light in weight and improved in strength and yield, and an improved method of producing such yoke.

According to a first aspect of the present invention, there is provided a method of producing a yoke of a universal joint, the yoke being substantially U-shaped and including a base portion and first and second arm portions, the method comprising the following steps in the sequence:

(a) shearing a metal plate which is rectangular in shape and has certain uniform width and thickness so as to form a blank which is rectangular in shape and consists of a middle portion and first and second end portions;

(b) squeezing the middle portion of the blank by cold forging so that the middle portion is expanded to have first and second peripheral bulge portions which are opposed to each other and that the expanded middle portion becoming substantially oval in shape and thinner than the first and second end portions in thickness; and (c) pressing the blank with a press machine to produce the yoke so that the expanded middle portion and the first and second end portions of the blank are turned into the base portion and the first and second arm portions of the yoke, respectively.

According to a second aspect of the present invention, there is provided a yoke of an universal joint, which is substantially U-shaped, monolithic in construction and produced from a blank having a middle portion and first and second end portions, the yoke comprising:

first and second arm portions which are respectively prepared from the first and second end portions of the blank, opposed to each other in a diametral direction of the yoke and uniform in thickness, and a base portion which is prepared from the middle portion of the blank and substantially parabolic in shape, the base portion being thinner than the first and second arm portions in thickness as a result of cold forging of the middle portion.

3

Figure 4:
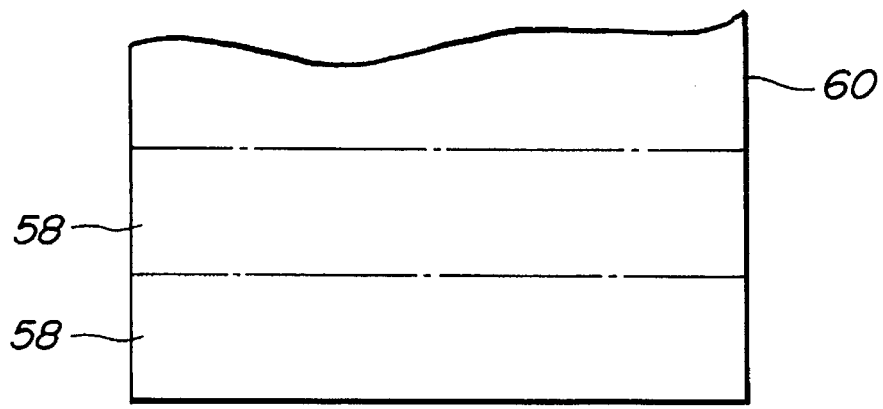
Figure 5:
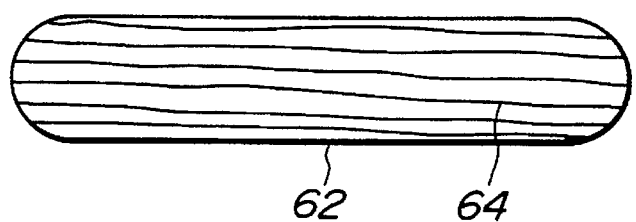
Figure 9:
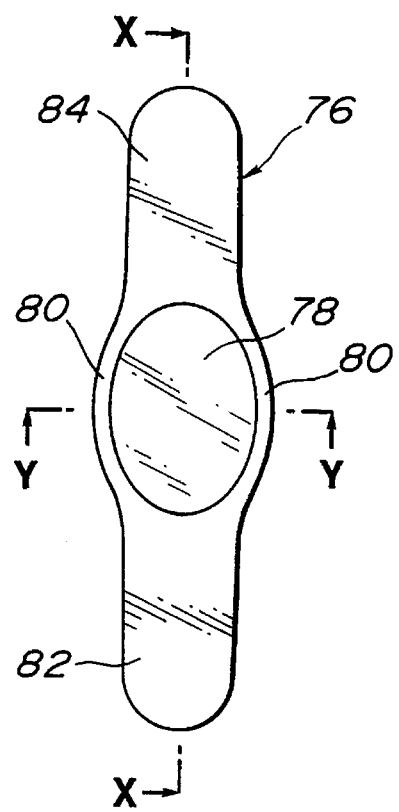
Figure 10:
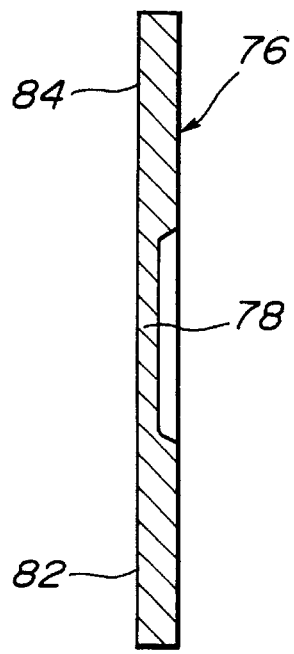
Figure 11:
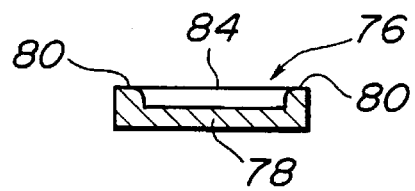
Figure 12:
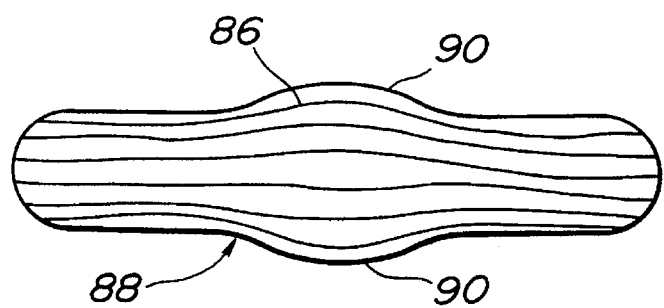
Figure 13:
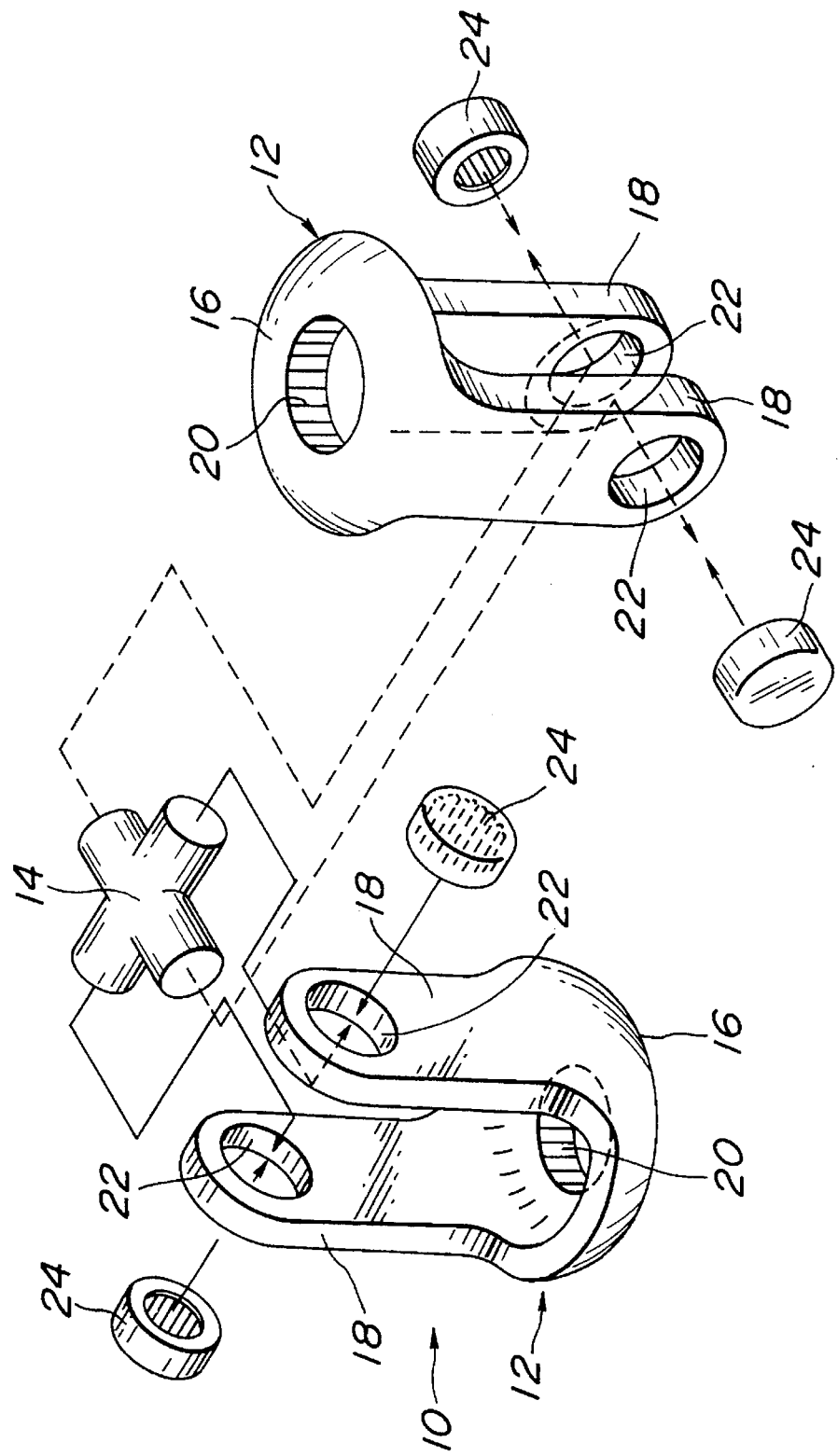
Figure 14:
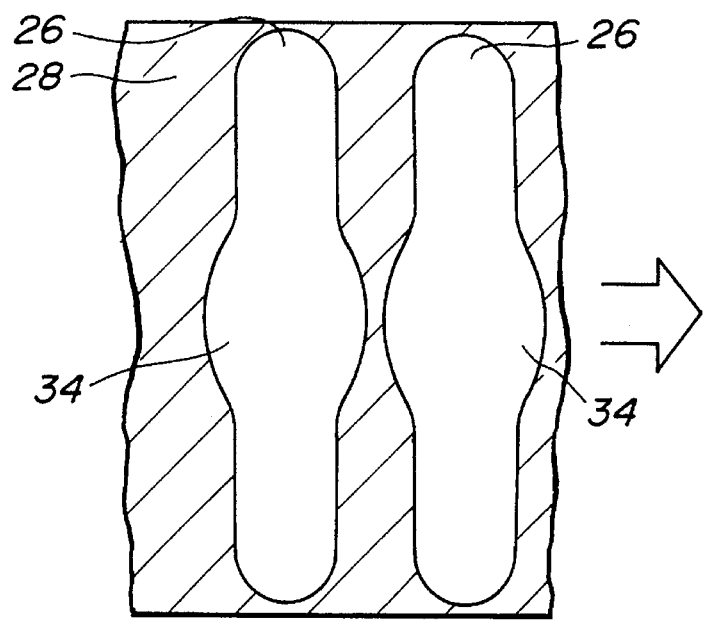
Figure 16:
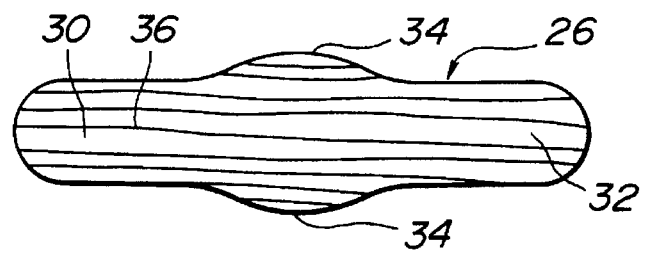
Figure 17:
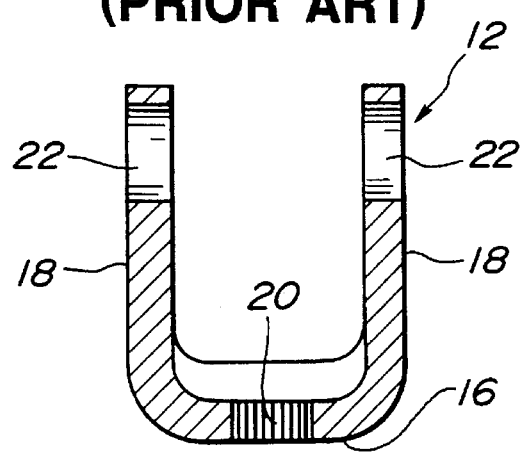
Figure 15:
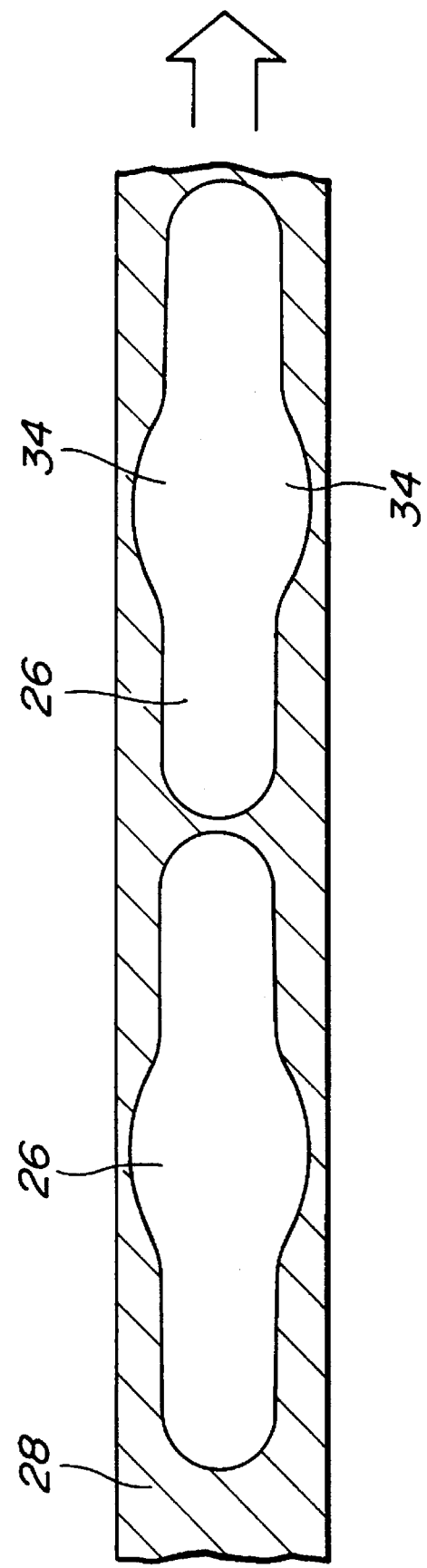

FIG. 4 is a plan view showing a blank arrangement on a steel plate according to a method of the present invention;

FIG. 5 is a plan view showing a round-cornered blank of the yoke of the present invention;

FIG. 6 is a plan view of a blank of which middle portion has been squeezed by cold forging according to an embodiment of a method of the present invention;

FIG. 7 is a sectional view taken along the line X—X of FIG. 6;

FIG. 8 is a sectional view taken along the line Y—Y of FIG. 6;

FIG. 9 is a view similar to FIG. 6, but showing a blank according to another embodiment of the present invention;

FIG. 10 is a sectional view taken along the line X—X of FIG. 9;

FIG. 11 is a sectional view taken along the line Y—Y of FIG. 9;

FIG. 12 is a view similar to FIGS. 6 and 9, but showing fiber flows of the blank according to the present invention;

FIG. 13 is a perspective exploded view of a universal joint having a pair of conventional yokes;

FIG. 14 is a plan view showing a blank arrangement on a steel plate according to a conventional method;

FIG. 15 is a plan view showing another blank arrangement on another steel plate according to a conventional method;

FIG. 16 is a view similar to FIG. 12, but showing fiber flows of a blank of the conventional yoke; and FIG. 17 is an elevational sectional view of the conventional yoke.

DETAILED DESCRIPTION OF THE INVENTION

Figure 1:
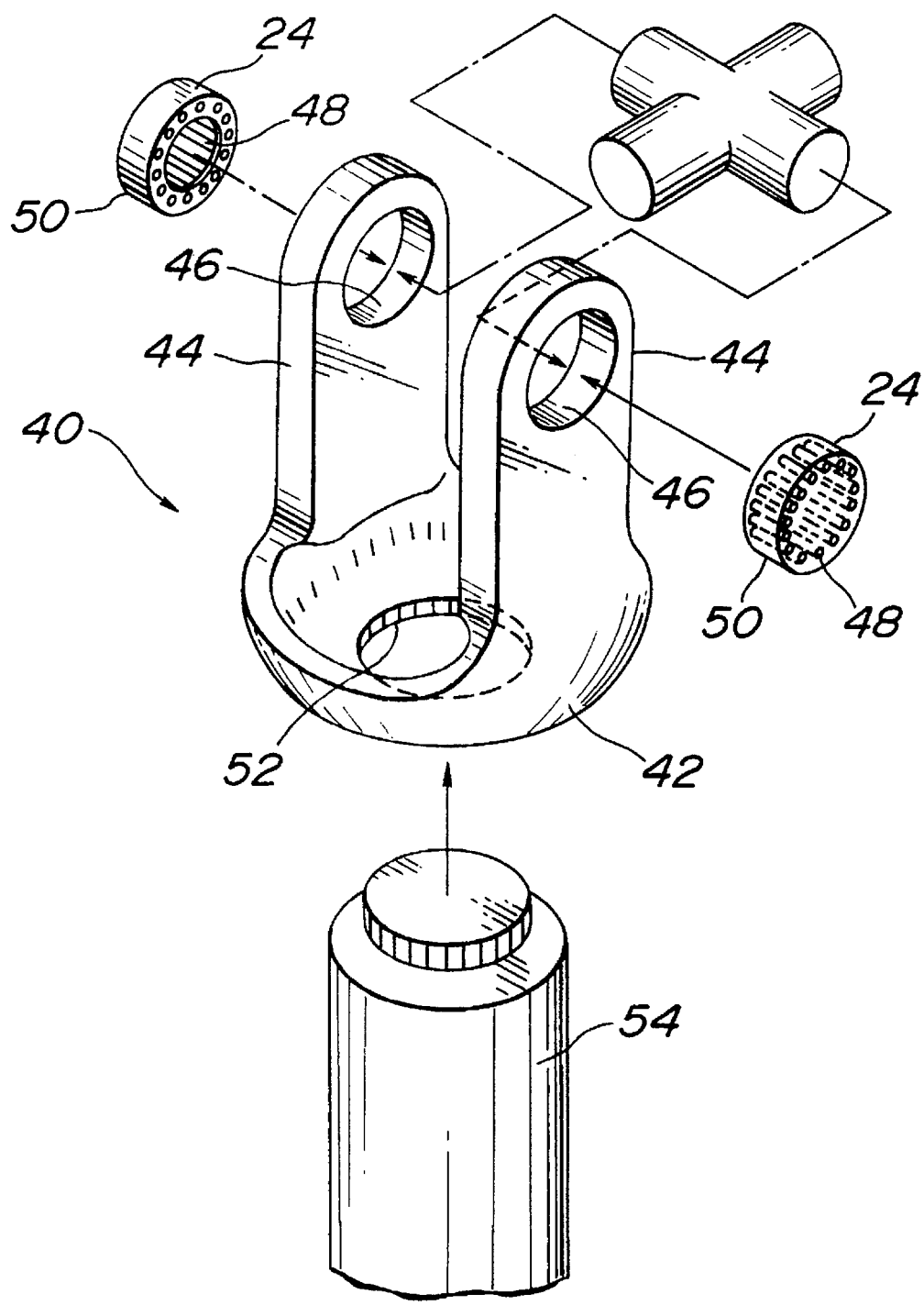
FIG. 1 is a perspective exploded view of a universal joint having a yoke according to an embodiment of the present invention.
Figure 2:
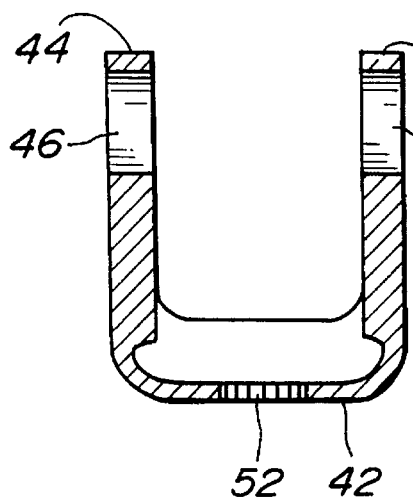
FIG. 2 is an elevational sectional view of the yoke shown in FIG. 1.
Figure 3:
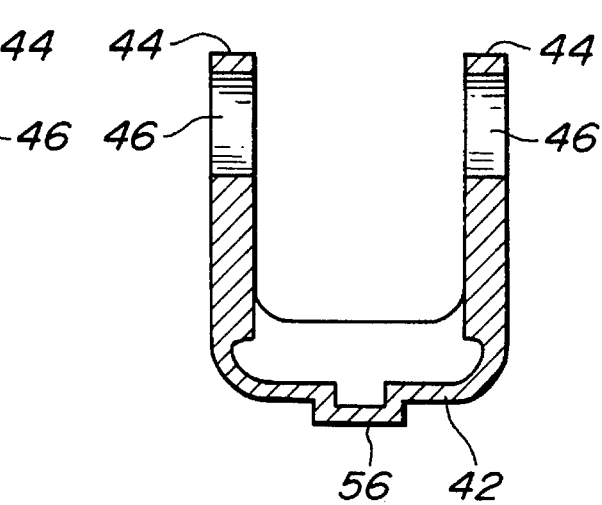
FIG. 3 is a view similar to FIG. 2, but showing a yoke according to another embodiment of the present invention.

With reference to FIGS. 1–3, a yoke according to the present invention will be described in the following.

Parts substantially the same as those of the above-mentioned conventional universal joint are denoted by the same numerals and a detailed explanation of them will be omitted from the following description.

As is shown in FIG. 1, a yoke 40 according to the present invention is substantially U-shaped and comprises a base portion 42 and a pair of arm portions 44. Each arm portion 44 has a circular opening 46 into which a bearing 24 is pressed. The bearing 24 has a plurality of needle bearings 48 received in a bearing cup 50. The base portion 42 has a circular opening 52 having serrations. The base portion 42 is engaged with a serrated steering shaft 54 by inserting the shaft 54 into the circular opening 52, and welded to the steering shaft 54. However, it is optional that the base portion 42 and the steering shaft 54 are secured to each other by caulking. As is shown in FIG. 3, instead of the circular opening 52, the base portion 42 may have an embossed portion 56 which is to be engaged with a steering shaft (not shown). As is shown in FIGS. 2 and 3, the base portion 42 is thinner than the arm portions 44 in thickness.

With reference to FIGS. 4–12, a method of producing the yoke 40 according to the present invention will be described in the following.

As is seen from FIG. 4, at first, blanks 58 which are rectangular in shape are produced by shearing a long narrow steel plate 60. Then, as is seen from FIG. 5, four corner portions of the blank 58 are removed to form a round-cornered blank 62. It is preferable that the steel plate 60 is sheared so as to arrange fiber flows 64 (flows of metallographic structure) of the blank 62 in a longitudinal direction of the blank 62 (see FIG. 5). Then, a middle portion of the blank 62 is squeezed with a press machine or a combination of a punch and a die by cold forging. With this, metal of the middle portion flows in a longitudinal direction of the blank 62 and in a direction which is perpendicular to the longitudinal direction. With this, as is seen from FIGS. 6–8, a blank 66 is formed with an oval middle portion 68 having peripheral bulge portions 70. As is seen from FIGS. 7 and 8, the oval middle portion 68 is thinner than first and second end portions 72, 74 of the blank 66 in thickness. As is seen from FIGS. 9–11, it is optional that a middle portion of the blank 62 is squeezed by cold forging in such a manner that a blank 76 is formed with an oval middle portion 78 and peripheral bulge portions 80. As is seen from FIGS. 10 and 11, the oval middle portion 78 is thinner than first and second end portions 82, 84 of the blank 76, and the peripheral bulge portions 80 have the same thickness as that of the first and second end portions 82, 84. As is seen from FIG. 12, fiber flows 86 of the middle portion of the blank 88 which has been squeezed by cold forging are curved so as to conform to the shape of the peripheral bulge portions 90. It should be noted that the blanks 66, 76 have substantially the same fiber flow pattern as that of the blank 88. It should be noted that, unlike the above-mentioned conventional blank 26, fiber flows 86 are continuous between longitudinal ends of the blank 88. Therefore, the blank of the present invention is not reduced in strength. In fact, the middle portion of the blank of the present invention is increased in tensile strength. The thus formed blank is pressed with a press machine so as to form the yoke 40. With this pressing, the middle portion and the first and second end portions of the blank are turned into the base portion 42 and the arm portions 44, respectively. Then, the two circular openings 46 are formed through the arm portions 44, and the circular opening 52 or the embossed portion 56 is formed on the base portion 42. Advantages of the present invention will be discussed in the following.

The arm portions 44 of the yoke 40 have the same thickness as that of the arm portions 18 of the conventional yoke 12. Therefore, the arm portions 44 can stably hold the bearings 24 in the circular openings 46. The base portion 42 of the yoke 12 is thinner than that of the base portion 16 of the conventional yoke 12 in thickness. However, the base portion 42 has a sufficient strength because the base portion 42 is squeezed by cold forging and parabolic in shape. According to the present invention, the rectangular blank 58 is taken from the steel plate 60. Therefore, the amount of waste steel is substantially reduced as compared with the conventional method, and thus the yield is increased. The yoke 40 of the present invention having a sufficient strength is lighter than the conventional yoke 12 in weight.

What is claimed is:

1. A yoke of an universal joint, which is substantially U-shaped, monolithic in construction and produced from a blank having a middle portion and first and second end portions, the yoke comprising:

first and second arm portions which are respectively prepared from the first and second end portions of the blank, opposed to each other in a direction perpendicular to a longitudinal direction of the yoke and uniform in thickness; and a base portion which is prepared from the middle portion of the blank and is substantially parabolic in shape, the base portion being thinner than the first and second arm portions in thickness as a result of cold forging of the middle portion.

2. A yoke of a universal joint, the yoke being substantially U-shaped and including a base portion and first and second arm portions, the yoke being prepared by a method and comprising the following steps in sequence:
 (a) shearing a metal plate which is rectangular in shape and has a first uniform width and a first uniform thickness so as to form a blank which is rectangular in shape and consists of a middle portion and first and second end portions;
 (b) squeezing the middle portion of the blank by cold forging so that the middle portion is expanded to have first and second peripheral bulge portions which are opposed to each other and so that the expanded middle portion becomes substantially oval in shape and thinner than the first and second end portions in thickness; and
 (c) pressing the blank with a press machine to produce the yoke so that the expanded middle portion and the first and second end portions of the blank are turned into the base portion and the first and second arm portions of the yoke, respectively.

3. A yoke according to claim 2, wherein the base portion of the yoke is substantially parabolic in shape.

4. A yoke according to claim 2, wherein the expanded middle portion and the first and second peripheral bulge portions have a second uniform thickness thinner than said first uniform thickness.

5. A yoke according to claim 2, wherein the first and second peripheral bulge portions have said first uniform thickness of the first and second end portions.

6. A yoke according to claim 2, wherein the metal plate is made of steel.

7. A yoke according to claim 2, wherein fiber flows of the expanded middle portion of the blank are curved so as to conform to the shape of the first and second peripheral bulge portions so that the fiber flows are continuous between longitudinal ends of the blank.

8. A method of producing a yoke of a universal joint, which is substantially U-shaped, monolithic in construction and produced from a blank having a middle portion and first and second end portions, the yoke comprising:
 first and second arm portions which are respectively prepared from the first and second end portions of the blank, opposed to each other in a direction perpendicular to a longitudinal direction of the yoke and uniform in thickness, and
 a base portion which is prepared from the middle portion of the blank and substantially parabolic in shape, the base portion being thinner than the first and second arm portions in thickness as a result of cold forging of the middle portion,
the method comprising the following steps in sequence:
 (a) shearing a metal plate which is rectangular in shape and has certain uniform width and thickness so as to form a blank which is rectangular in shape and consists of a middle portion and first and second end portions;
 (b) squeezing the middle portion of the blank by cold forging so that the middle portion is expanded to have first and second peripheral bulge portions which are opposed to each other and that the expanded middle portion becomes substantially oval in shape and thinner than the first and second end portions in thickness; and
 (c) pressing the blank with a press machine to produce the yoke so that the expanded middle portion and the first and second end portions of the blank are turned into the base portion and the first and second arm portions of the yoke, respectively.

* * * * *